(12) United States Patent
Dally et al.

(10) Patent No.: US 6,717,942 B1
(45) Date of Patent: Apr. 6, 2004

(54) SPACE-EFFICIENT SOURCE ROUTING

(75) Inventors: William J. Dally, Stanford, CA (US);
P. Allen King, Needham, MA (US);
William F. Mann, Sudbury, MA (US);
Philip P. Carvey, Bedford, MA (US);
Larry R. Dennison, Norwood, MA (US)

(73) Assignee: Avici Systems, Inc., Billerica, MA (US)

( * ) Notice: Subject to any disclaimer, the term of this patent is extended or adjusted under 35 U.S.C. 154(b) by 0 days.

(21) Appl. No.: 09/104,478

(22) Filed: Jun. 25, 1998

(51) Int. Cl.[7] .............................................. H04L 12/56
(52) U.S. Cl. ....................................... 370/389; 370/392
(58) Field of Search ................................ 370/351, 355, 370/356, 389, 392, 393, 397, 399, 409

(56) References Cited

U.S. PATENT DOCUMENTS

| | | | | |
|---|---|---|---|---|
| 4,933,933 A | * | 6/1990 | Dally et al. ................... 370/60 |
| 5,088,090 A | * | 2/1992 | Yacoby ..................... 370/85.13 |
| 5,157,692 A | * | 10/1992 | Horie et al. ................... 375/260 |
| 5,181,017 A | * | 1/1993 | Frey et al. ................... 709/239 |
| 5,280,480 A | * | 1/1994 | Pitt et al. ................... 370/85.13 |
| 5,282,270 A | * | 1/1994 | Oppenheimer et al. ..... 395/200 |
| 5,388,213 A | * | 2/1995 | Oppenheimer et al. ..... 395/200 |
| 5,797,035 A | * | 8/1998 | Birrittella et al. ............. 710/35 |
| 5,841,772 A | * | 11/1998 | Daniel et al. ................. 370/395 |
| 5,963,556 A | * | 10/1999 | Varghese et al. ............. 370/401 |
| 6,052,683 A | * | 4/2000 | Irwin ............................. 707/8 |
| 6,137,797 A | * | 10/2000 | Bass et al. ................... 370/392 |
| 6,339,595 B1 | * | 1/2002 | Rekhter et al. ............. 370/392 |

OTHER PUBLICATIONS

Stunkel, C.B., et al., "The SP2 High-Performance Switch," IBM Systems Journal, vol. 34, No. 2, 1995, pp. 184–204.

Foley, James D. et al., "Fundamentals of Interactive Computer Graphics," Addison-Wesley Publishing Company, 1982, pp. 498–499.

McIliece, Robert J., "The Theory of Information and Coding, A Mathematical Framework for Communication," Addison-Wesley Publishing Company, 1977, Chapter 10, pp. 237–247.

Abali, B., et al., "Routing Algorithms for IBM SP1", Parallel Computer Routing and Communication, First Int'l Workshop, PCRCW '94, pp. 160–175 (1994).

* cited by examiner

*Primary Examiner*—Alpus H. Hsu
*Assistant Examiner*—Toan D. Nguyen
(74) *Attorney, Agent, or Firm*—Hamilton, Brook, Smith & Reynolds, P.C.

(57) ABSTRACT

The required length of a route descriptor in a source routing system is obtained by inserting an implied exit field, use of run-length encoding, and use of variable-length encoding. In the variable-length encoding, codes having lesser bits are reserved for preferred directions. Preferred direction may be encoded in the routing header, and it may be implied by the arrival port.

14 Claims, 5 Drawing Sheets

SPACE-EFFICIENT SOURCE ROUTING

FIELD OF THE INVENTION

The invention relates to source routing in which each hop of a route through a network is encoded at a source by port descriptors in a header of a packet.

BACKGROUND OF THE INVENTION

Interconnection networks are used to route packets between terminal nodes in multicomputers, network routers, and other digital systems. Such networks consist of a number of fabric routing nodes arranged in a particular network topology, for example a butterfly or a torus. For a packet to travel from one terminal node A to another terminal B the packet must be routed; that is, it must select an output port at each switch node along the route from the source terminal to the destination terminal. With source routing, these selections are encoded in a routing header which contains a field for each hop along the route.

FIG. 1 shows an example interconnection network, and 8×2×2 three-dimensional torus. This network contains 32 nodes, each of which is identified by a three-digit address, zyx, the digits represent its coordinates in the z, y, and x dimensions, respectively. For example, node A in the figure is at address 001, and node B is at address 105. Each node in the figure is connected to six fabric channels, one in the positive and one in the negative direction in each of the three dimensions. The nodes on the boundary of the network have one or more channels that wrap around to the other side of the network. For clarity, the end-around channels in the y and z dimensions are omitted from several nodes.

FIG. 1 also shows a route from node A (001) to node B (105), denoted by arrows in the figure. This route contains five steps or hops. The source routing header for this route is a string of six port selectors: (+x,+x,+z,+x,+x,e). The first five port selectors specify the output ports to be taken for the five steps of the route. The final port selector, e, directs the packet to exit the network after completing the fifth hop. At each node along the route, starting with node A, the routing header is interpreted by using the first port selector to select the output port at that node and then removing this port selector from the route. For example, at node 002 (just to the right of A), the packet arrives with routing header (+x,+z,+x,+x,e). The first selector (+x) is used to select the +x output port of this node and then removed from the header leaving a header of (+z,+x,+x,e) for node 003.

In a three dimensional torus, such as shown in FIG. 1, there are seven possible output ports at each step (six directions and exit) and thus the port selector can be encoded in a three-bit field with one unused code. One possible encoding is shown in the following table.

| Port | Code |
|---|---|
| +x | 000 |
| −x | 001 |
| +y | 010 |
| −y | 011 |
| +z | 100 |
| −z | 101 |
| e | 111 |

With this encoding, the route shown in FIG. 1 would be encoded as the 18-bit string; 000 000 100 000 000 111. With the route encoded in this manner, the leftmost three bits are used at each step of the route to select the next output port, and then the encoded route is shifted three-bits left to expose the next port selector for the next step of the route.

The mechanism used to process source routes is illustrated in FIG. 2. An input route register (IRR) 10 holds the source route from the header of an arriving packet. In the figure, the IRR consists of five three-bit port selectors, 11–15, packed into 15 bits. This small number of fields is used to avoid cluttering the figures. In most routes, considerably longer route registers are used as four hops is insufficient for all but the smallest networks. The IRR is processed to generate the current port selector (CPS) which selects the output port to be used by the packet, and to generate an output route register (ORR) 20 which will be used as the routing header by the router at the next hop. These two functions take place by simple field selection. No logic is required. The leftmost port selector from the IRR is selected as the CPS, and the remaining port selectors are shifted to the left to fill the first four port selectors of the ORR, 21–24. The fifth port selector 25 may be filled with an arbitrary value.

Routers that employ source routing in this manner are similar to those described in U.S. Pat. No. 6,370,145, which issued on Apr. 9, 2002, entitled "Internet Switch Router," which is incorporated herein by reference in its entirety.

SUMMARY OF THE INVENTION

Encoding source routes using fixed-length port selector fields gives a simple routing descriptor, but one that consumes more space than necessary. In large interconnection networks, the space required by these descriptors can become prohibitive and may limit the scalability of the network. For example, if a routing header for a three-dimensional torus must fit into 32-bits, at most 9 hops can be encoded. Only 10 three-bit fields fit into 32 bits, and one field is required for the exit code at the end of the route.

By using a variable-length routing port descriptor, where the more likely ports are encoded with fewer bits than the less likely ports, we can substantially reduce the required length of a route descriptor. This improves storage efficiency, reduces the overhead of packet headers, and allows us to encode a longer route in a fixed-size descriptor.

In different embodiments, several techniques for space-efficient coding may be used independently or combined:

1. The requirement for an exit descriptor can be eliminated by always shifting in an exit descriptor on the right side of the route when left shifting the route to discard a used port descriptor.
2. Coding for runs of identical port descriptors with run length coding optimizes the common case where a route travels several hops in one direction.
3. More likely ports may be encoded with fewer bits than less likely ports using a variable length code.
4. In variable length coding, a preferred direction can be encoded in the packet header that specifies a set of encoding rules in which the ports that carry a packet in the preferred direction can be encoded with short descriptors while longer descriptors are required to encode a non-preferred direction.
5. The port on which an arriving packet arrives may be used as an implied preferred direction in that dimension thus reducing the length of a preferred direction field by one bit.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Implied Exit Descriptor

Figure 3:
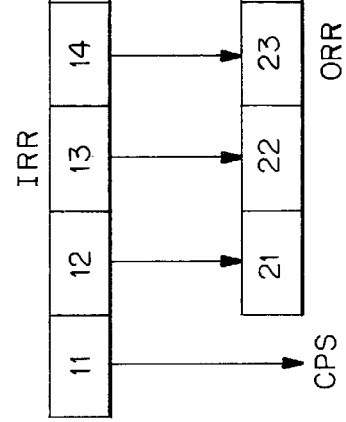
FIG. 3 illustrates an input route register and output route register embodying one aspect of the invention where implied exit codes are inserted.
Figure 2:
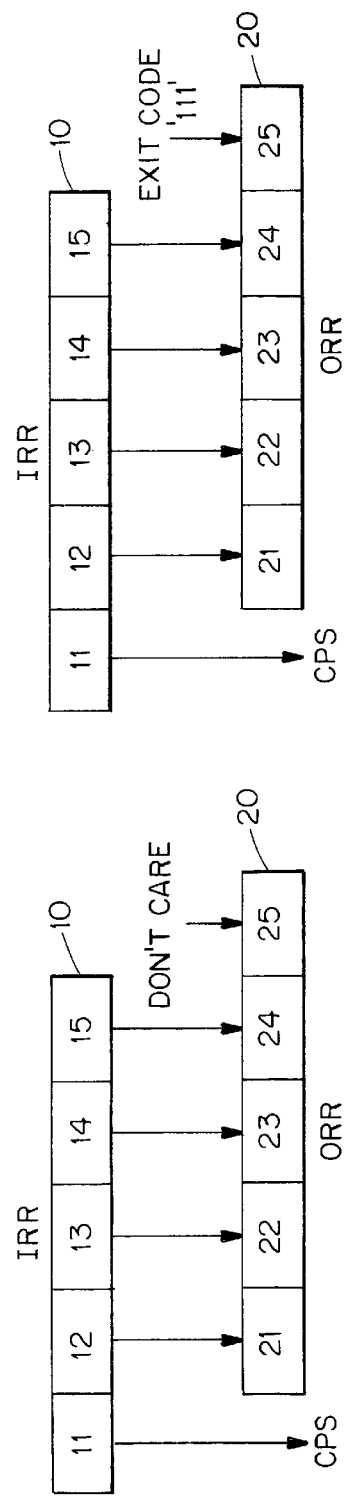
FIG. 2 illustrates an input route register and output route register used to process source routes in the prior art.

FIG. 3 shows how the number of hops that can be encoded by a routing header of a given length may be increased by one by implicitly encoding the exit port descriptor. This is accomplished by filling the final (rightmost) port descriptor of the ORR with an exit code (all 1s). In effect, there is always an implied exit descriptor to the right of the rightmost port descriptor in a routing header. This allows us to encode a five-hop route in the five fields of the IRR since no field is required to explicitly encode the exit descriptor. For example, the route shown in FIG. 1 would be encoded in the IRR as 000 000 100 000 000. The logic of FIG. 3 selects the leftmost port descriptor, 000, as the CPS. The logic also shifts the remaining port descriptors left while filling in the right with the exit code giving a route descriptor in the ORR of 000 100 000 000 111. After the first hop of the route, the exit descriptor becomes explicit. For routes that are shorter than the maximum length, an explicit exit descriptor is always used to terminate the route.

Run-Length Descriptor Coding

Figure 4:
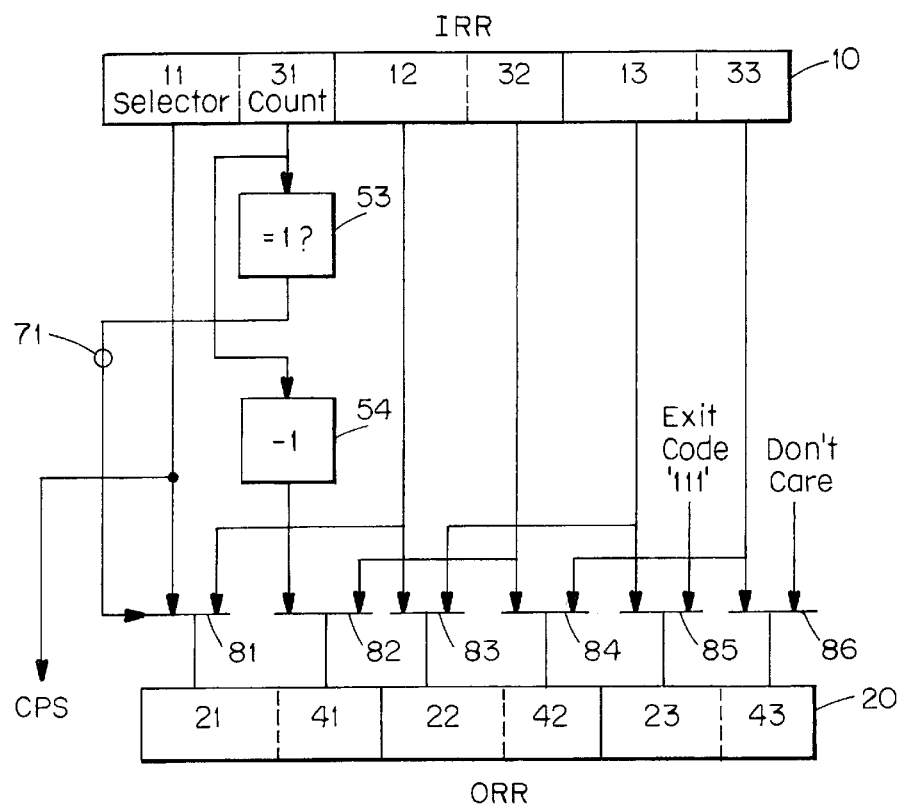
FIG. 4 illustrates another embodiment of the invention which implements run length coding of selectors.

In large interconnection networks, it is common to include multiple hops in a single direction before changing directions. We can exploit this regularity in routing by encoding runs of port selectors in a single port descriptor. FIG. 4 illustrates a simple implementation of this concept. Here the IRR 10 consists of three port descriptors each consisting of a three-bit port selector, 11–13, and a two-bit count, 31–33. One skilled in the art will understand that different width fields may be used for the selector and count and that the selector and count may be combined in a single field using symbols from an alphabet that jointly encodes the selector and count. With the representation of FIG. 4, the leftmost selector 11 is used as the CPS to select the output port to be taken by the packet. The leftmost count 31 is used to determine the number of hops the packet should take in this direction before moving on to the next port descriptor. The two-bit hop count can encode a number of hops between 1 and 4. For example, the offset-1 code (00=1, 01=2, 10=3, 11=4) may be used.

When a packet arrives at a router that implements the run-length coding of FIG. 4, the ORR is generated by processing the leftmost count field 31 and multiplexing as shown in the figure. The count field is first examined by a comparator 53 to see if it encodes a single hop (code 00). If so, then line 71 is driven high causing the six multiplexers 81–86 to select their right input and thus shift the port descriptors to the left. In this case, the leftmost output selector 21 is determined from the input selector 12, output count 41 is determined from input count 32, and so on. If the leftmost input count field encodes more than a single hop, then line 71 is driven low and multiplexers 81–86 select their left input. In this case, the fields of the IRR are passed directly across to the ORR with the leftmost count field being decremented by decrementer 54.

Figure 1:
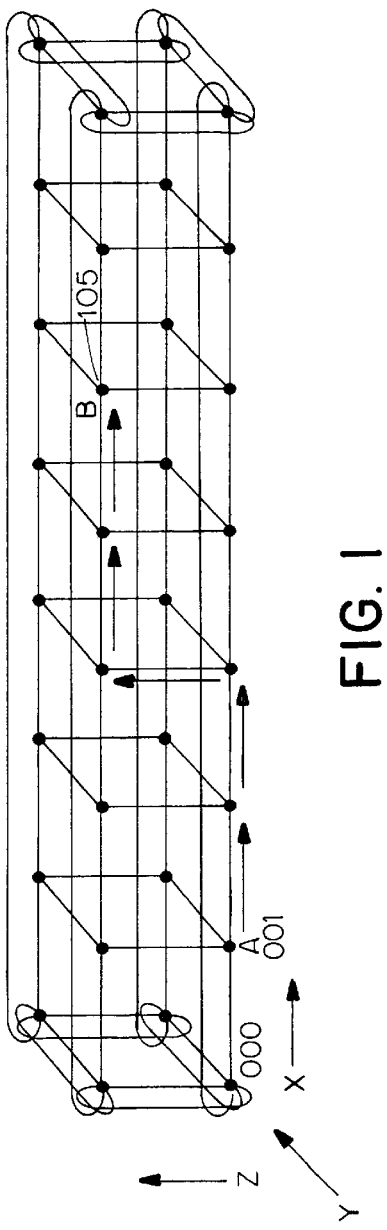
FIG. 1 illustrates a conventional 8×2×2 three dimensional torus.

Consider, for example, the route shown in FIG. 1. With the variable-length coding of FIG. 4, this route would be encoded as 000 01 100 00 000 01 which encodes two hops in +x, one hop in +z, and two hops in +x. After the first hop, the routing header would become 000 00 100 00 000 01 which encodes one hop in +x, one hop in +z, and two hops in +x. After the second hop, the leftmost field is shifted off and the header becomes 100 00 000 01 111 00 which encodes one hop in +z, two hops in +x, and exit.

Run-length coding is particularly advantageous in large networks. The 15-bit routing header of FIG. 4 can represent routes of up to 12 hops, enough to route between each pair of nodes in an 8×8×8 network of 512-nodes. More typically, a 32-bit routing header with 5 descriptors, each containing a 3-bit selector and a 3-bit count, can encode routes of up to 40 hops, enough to route between any pair of nodes in a 32×32×16 network of 16K nodes.

Run-length coding is inefficient at coding routes that change direction on every hop. For such routes, run-length coding takes more bits to encode each port descriptor with no reduction in the number of descriptors. To overcome this limitation in applications that require such routes, the routing header can be augmented by a bit that selects between run-length coding (FIG. 4) and conventional coding with an implied exit code (FIG. 3). By using this bit to always select the most efficient encoding, the coding density is never more than one bit worse than for conventional coding.

Variable-Length Port Descriptors

In a network that has dimensions of unequal size, such as the network of FIG. 1, a packet is more likely to travel in a long dimension than in a short dimension. To first approximation, in the 8×2×2 network of FIG. 1, a packet is four times as likely to travel in x than in y or z. Using the well known technique of maximum entropy coding (Huffman coding), one can take advantage of this uneven probability of routing in different dimensions by using the variable-length port selectors shown in the table below:

| Code | Port | Length |
|------|------|--------|
| +x   | 00   | 2      |
| −x   | 10   | 2      |
| +z   | 010  | 3      |
| −z   | 011  | 3      |
| +y   | 110  | 3      |
| −y   | 1110 | 4      |
| Exit | 1111 | 4      |

With the probability of x selectors four times that of y or z selectors, this encoding gives an average selector length of 2.4 bits, saving 20% over a fixed-length encoding.

Figure 5:
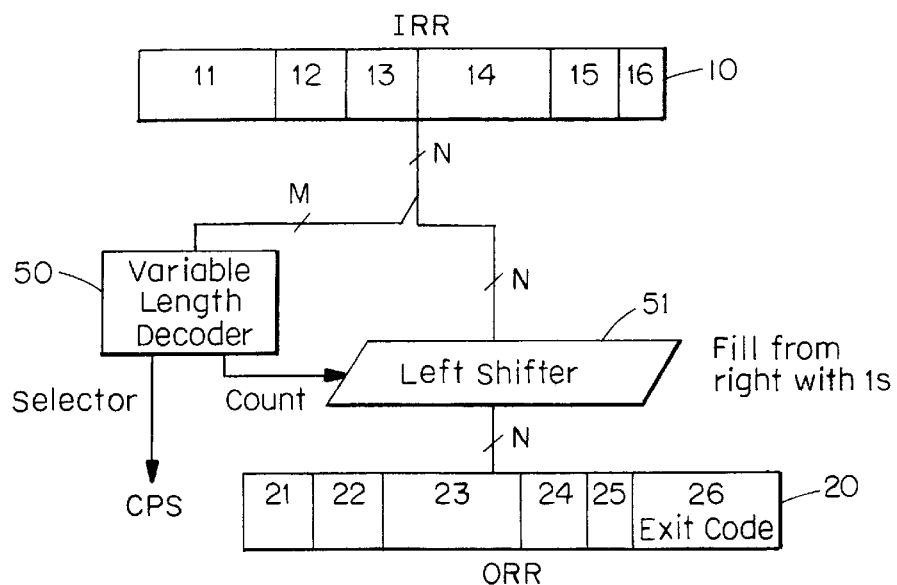
FIG. 5 illustrates another embodiment of the invention which implements variable-length coding of selectors.

A circuit for decoding routing headers containing variable-length port selectors is shown in FIG. 5. Because the length of the leftmost port selector is not known a-priori, a variable length decoder examines the leftmost M bits of the routing header, where M is the maximum length of a port selector. If the leftmost selector is shorter than maximum length, not all of these bits will belong to the selector. The decoder uses these bits to determine the matching code from the table above and outputs the corresponding fixed-length port selector and the length of the code, L. The determination can be made because none of the three and four bit codes share the first two bits with any two bit code, and no four bit code shares the first three bits with any three bit code. The selector is used to select the output port for the packet, while the length field is used to control a left-shifter that shifts the routing header L bits (between 1 and M) to the left, filling in 1s from the right. This shift discards the leftmost L-bit code and fills in at least part of the implied exit code. By choosing an all 1s representation for the exit code, the implied exit code described above is achieved even though it may take several shifts to complete the exit code. One skilled in the art of router design will understand that the variable length decoder may be implemented as a lookup table indexed by its M-bit input or using logic gates.

Preferred Directions Variable Length Coding

In a network that employs minimal routing, viz. in which packets follow a shortest path from source to destination, a packet will travel in only a single direction in each dimension. For example, a packet traveling from node 000 to node 333 in an 8×8×8 torus network along a shortest path will travel only in the +x, +y, and +z directions and never in the −x, −y, or −z directions. Thus, while the overall distribution of output ports may be uniform, a given packet has a very non-uniform distribution with three ports very likely and three ports very unlikely.

We can exploit the tendency of an individual packet to route only in certain directions by including a preferred direction field within each routing header. This field encodes the directions that a packet is most likely to travel. The port selectors in the routing header are then encoded using a variable-length code specific to the preferred direction. In effect, the preferred direction field in a packet's header selects the code book used to decode the port descriptors in that header.

A simple method of encoding the preferred direction in a three-dimensional torus network, such as the network of FIG. 1, is to use a three-bit field where each bit specifies the preferred direction in each of the three dimensions. The first bit encodes the preferred direction in x(0=+, 1=−), the next bit encodes y, and the final bit encodes z. The table below enumerates this code. One skilled in the art will understand that other encodings are possible and that more or fewer probability distributions may be specified by using a longer or shorter preferred direction field.

| Code | Preferred Direction |
| --- | --- |
| 000 | +x,+y,+z |
| 001 | +x,+y,−z |
| 010 | +x,−y,+z |
| 011 | +x,−y,−z |
| 100 | −x,+y,+z |
| 101 | −x,+y,−z |
| 110 | −x,−y,+z |
| 111 | −x,−y,−z |

The preferred direction code in the routing header can be compressed by one bit by using the channel on which a packet arrives to specify the preferred direction in one dimension. The routing header needs only to encode the preferred direction in the other two dimensions. For example, if a packet with a preferred direction of −x,+y,−z arrives in the −x direction, the x-bit of the preferred direction code may be dropped and the code shortened to 01.

The table below shows a possible encoding of the port selector fields in a routing header that includes a preferred direction field. With this encoding, the three preferred directions are represented by two-bit codes, the non-preferred or reverse directions are represented by four-bit codes, and the all 1s code is used to specify the exit port to facilitate use of an implied exit port selector as described above. This code is particularly convenient as it can easily be decoded to the current port selector by taking the two most-significant bits from the port selector code and the least significant bit from the preferred direction field. The most-significant bits are taken from the first two bits of the code unless the code is 11, in which case they are taken from the second two bits. For example, if the preferred direction is 101 from the above table and the port selector code is 1101 from the table below, the current port selector is 011. The first two bits are taken from 1101, and the final bit is the reverse of the y field of the direction code. One skilled in the art will understand that other encodings are possible.

| Code | Port | Length |
| --- | --- | --- |
| 00 | Preferred x | 2 |
| 01 | Preferred y | 2 |
| 10 | Preferred z | 2 |
| 1100 | Reverse x | 4 |
| 1101 | Reverse y | 4 |
| 1110 | Reverse z | 4 |
| 1111 | Exit | 4 |

Once a packet reverses direction, it often continues in the new direction. To take advantage of this behavior in encoding routing headers, the routing logic complements the appropriate bit of the preferred direction field whenever a reversing port selector is encountered. For example, if a packet arrives with a preferred direction field of 010 (+x,−y,+z) and the leftmost port selector is 1110 (Reverse z), the packet is routed in the −z direction and the preferred direction field is set to 011 (+x,−y,−z). The port selector codes, other than being shifted, remain unchanged since they were initially defined with the recognition that the preferred direction field would change.

Figure 6:
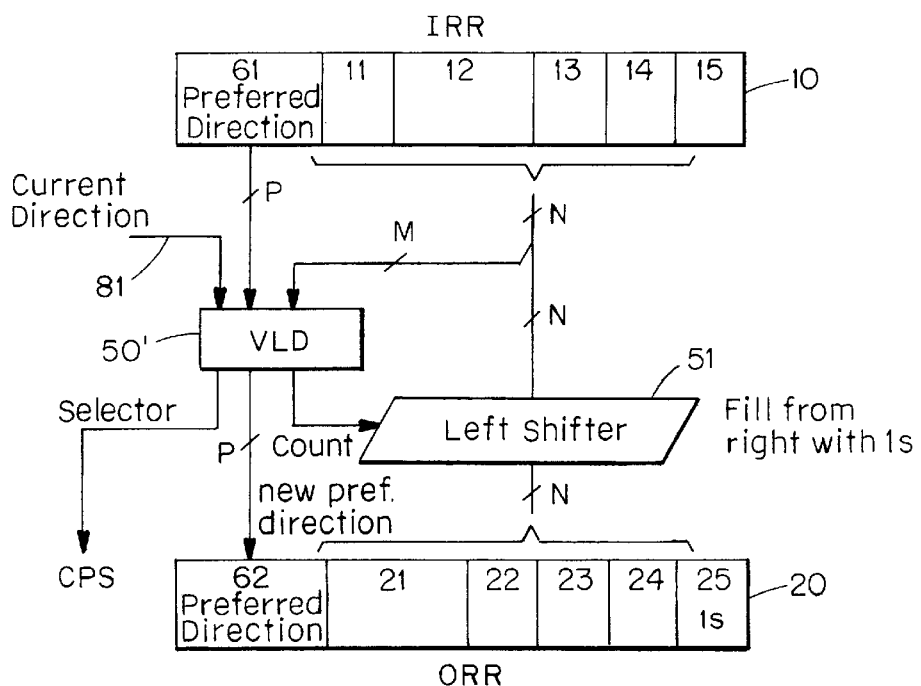
FIG. 6 illustrates an embodiment of the invention which uses variable-length coding based on preferred direction.

A circuit for decoding a routing header with a preferred direction field is shown in FIG. 6. The arrangement is similar to the decoder of FIG. 5 except that the preferred direction field of the IRR 61 and the current direction 81 are input to the variable-length decoder 50 and are used to select the code book to be used in decoding the leftmost port selector. The variable-length decoder also generates a new preferred direction field as an output to toggle the preferred direction in a given dimension when a reverse code is encountered.

Figure 8:
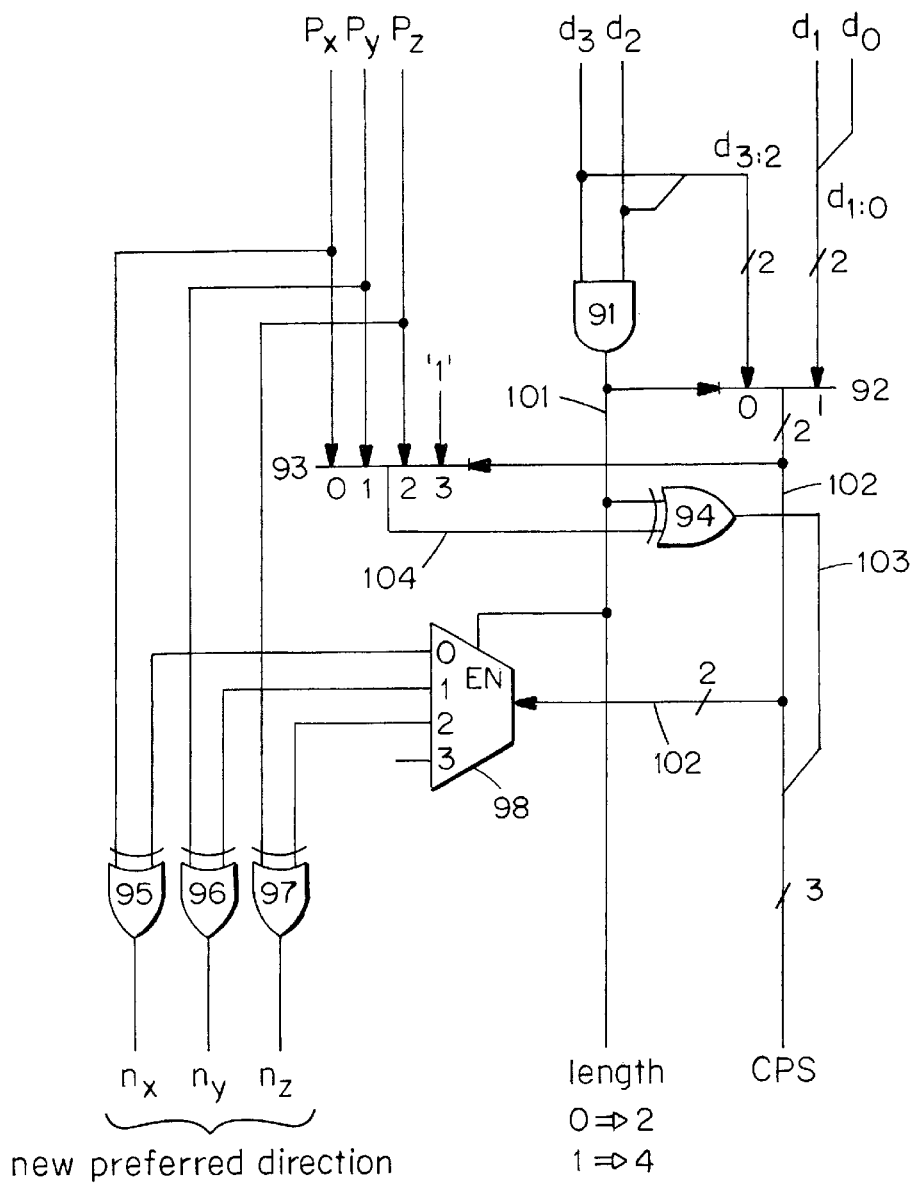
FIG. 8 illustrates a preferred direction decoder for use in the embodiment of FIG. 6.

A circuit that implements the variable length decoder for the preferred-direction code described above is shown in FIG. 8. The circuit accepts the current preferred direction $(p_x,p_y,p_z)$ and the leftmost M=4 bits of the port selector fields $(d_3 \ldots d_0)$ at the top. The circuit generates a new preferred direction $(n_x,n_y,n_z)$ a current port selector (CPS), and the length of the port selector. As there are only two possible lengths, 2 and 4, a single bit suffices to specify the length. (0 implies a length of 2, and 1 implies a length of 4.) AND-gate 91 detects if the code is a four-bit or two-bit code by examining the upper two descriptor bits. The output of this gate, line 101, is the length output of the decoder and is used to control multiplexer 92 and enable decoder 98. Multiplexer 92 selects the selector bits that specify the dimension to be routed on. For a two-bit code, line 101 is low and bits $d_{3:2}$ are selected. For a four-bit code, 101 is high and bits $d_{1:0}$ are selected. The selected dimension bits, on bus 102, are then used to select the preferred direction via multiplexer 93. For a four-bit code, the preferred direction on line 104 is complemented by XOR-gate 94 to produce the selected direction 103. The selected direction 103 and selected dimension 102 are combined to produce the current port selector output. To complement the preferred direction when a reverse code is encountered, decoder 98 decodes the selected dimension 102 when enabled by line 101. The output of this decoder is used to complement the appropriate bit of the preferred direction via XOR-gates 95–97.

One skilled in the art will understand that other possible implementations of the decoder are possible. For example, one could use a ROM or RAM lookup table to implement the decoder, or synthesize the logic for the decoder from a Verilog (RTL) description that specifies the tables above.

Combined Decoder

Figure 7:
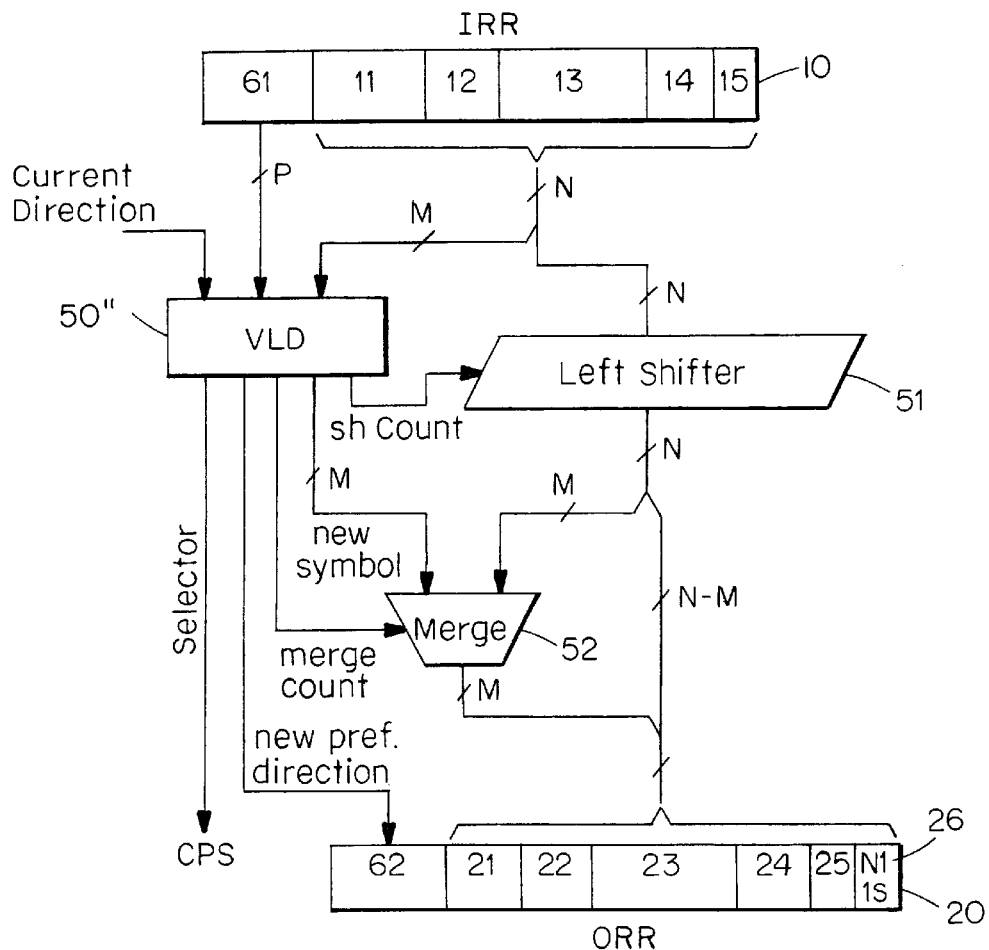
FIG. 7 illustrates an embodiment of the invention which includes implied exit codes, preferred direction variable-length coding and run length encoding.

The techniques of implied exit descriptor, preferred direction variable-length encoding, and run-length encoding of port selectors may be combined. FIG. 7 shows a block diagram of a decoder that combines all three techniques. The decoder is similar to that of FIG. 6 except that merge unit 52 has been added and variable decoder 50" has been augmented to add an M-bit new-symbol output and a $\log_2(M)$ bit merge count. The decoder operates in a manner similar to the decoder of FIG. 6. However, when the VLD detects a run-length encoded symbol where the run-length is greater than one, rather than shifting to strip the symbol off, it generates a new symbol, with the same direction but a run length of one less than the input symbol, and directs the merge unit to replace the leftmost port descriptor with the new symbol. When the run length equals one, the port descriptors are shifted to the left and 1s are filled in from the right. The thus shifted descriptors are then passed through to the ORR with the leftmost M bits simply passed through the merge unit 52.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A router using source routing for multiple hops of a route through a network, each of the multiple hops being encoded at a source by port descriptors in a header of a packet, the router comprising:

input router storage which receives port descriptors from a routing header of a packet, the port descriptors source coding each hop of the route through the network;

a port descriptor extractor which extracts a variable length next hop port descriptor from the routing header; and a header updating circuit which generates a new header representing a remaining route.

2. A router as claimed in claim 1 wherein the header updating circuit modifies a run count of the next hop port descriptor.

3. A router as claimed in claim 1 wherein port descriptor encodings are dependent on a preferred routing direction.

4. A router as claimed in claim 3 wherein a preferred direction is determined by an arrival port.

5. A router using source routing for multiple hops of a route through a network, each of the multiple hops being encoded at a source by port descriptors in a header of a packet, the router comprising:

input router storage which receives port descriptors from a routing header of a packet, the port descriptors source coding each hop of the route through the network;

a port descriptor extractor which extracts a variable length next hop port descriptor from the routing header; and a header updating circuit which generates a new header representing a remaining route, the header updating circuit inserting an implied exit field in the new header.

6. A router as claimed in claim 5 wherein the header updating circuit modifies a run count of the next hop port descriptor.

7. A router as claimed in claim 5 wherein port descriptor encodings are dependent on a preferred routing direction.

8. A method of routing multiple hops of a route through a network, each of the multiple hops being encoded at a source by port descriptors in a header of a packet, the method comprising, at a router:

storing port descriptors from a routing header of a packet, the port descriptors source coding each hop of the route through the network;

extracting a variable length next hop port descriptor form the routing header; and generating a new header representing a remaining route.

9. A method as claimed in claim 8 wherein the step of generating comprises modifying run a count of the next hop port descriptor.

10. A method as claimed in claim 8 wherein the encoding of a next hop port descriptor is dependent on a preferred routing direction.

11. A method as claimed in claim 10 wherein the preferred direction is determined by an arrival port.

12. A method of routing multiple hops of a route through a network, each of the multiple hops being encoded at a source by port descriptors in a header of a packet, the method comprising, at a router:

storing port descriptors from a routing header of a packet, the port descriptors source coding each hop of the route through the network;

extracting a variable length next hop port descriptor from the routing header; and generating a new header representing a remaining route, the step of generating comprising inserting an implied exit field in the routing header.

13. A method as claimed in claim 12 wherein the step of generating comprises modifying a run count of the next hop port descriptor.

14. A method as claimed in claim 12 wherein the encoding of a next hop port descriptor is dependent on a preferred routing direction.

* * * * *